(12) United States Patent
Homburg et al.

(10) Patent No.: US 6,397,569 B1
(45) Date of Patent: Jun. 4, 2002

(54) METHOD OF ADJUSTING A SENSOR UNIT MOUNTED ON A FIELD MACHINE AND AN ADJUSTING DEVICE THEREFOR

(75) Inventors: Helmut Homburg, Harsewinkel; Jochen Huster, Gütersloh, both of (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/442,433

(22) Filed: Nov. 17, 1999

(30) Foreign Application Priority Data

Nov. 18, 1998 (DE) .......................................... 198 53 085

(51) Int. Cl.⁷ .............................................. A01D 75/28
(52) U.S. Cl. .................................. 56/10.2 F; 56/10.2 R
(58) Field of Search ...................... 56/10.2 F, 10.2 R, 56/10.2 A, 119, DIG. 7, DIG. 10; 403/78, 79, 164, 150; 294/82.1, 81.1

(56) References Cited

U.S. PATENT DOCUMENTS

| | | | |
|---|---|---|---|
| 3,946,825 A | * 3/1976 | Gail | 180/79.2 R |
| 3,991,618 A | 11/1976 | Stampfer et al. | 73/432 R |
| 4,126,984 A | * 11/1978 | Gail | 56/10.2 |
| 4,219,093 A | * 8/1980 | Lang | 180/131 |
| 4,263,979 A | 4/1981 | Sturgill | 180/79.1 |
| 4,409,778 A | * 10/1983 | NcNaught | 56/10.2 |
| 4,561,797 A | * 12/1985 | Aldridge | 403/58 |
| 4,641,986 A | * 2/1987 | Tsui et al. | 403/164 |
| 4,868,752 A | * 9/1989 | Fujii et al. | 364/424.02 |
| 4,967,362 A | * 10/1990 | Schutten et al. | 364/424.07 |
| 5,002,420 A | * 3/1991 | Loyd | 403/165 |
| 5,234,070 A | * 8/1993 | Noah et al. | 180/169 |
| 5,303,636 A | 4/1994 | Stephenson et al. | 91/471 |
| 5,393,162 A | * 2/1995 | Nissen | 403/154 |
| 5,444,965 A | * 8/1995 | Colens | 56/10.2 A |
| 5,528,888 A | * 6/1996 | Miyamoto et al. | 56/10.2 F |
| 5,569,081 A | * 10/1996 | Baumgarten et al. | 460/112 |
| 6,101,795 A | * 5/1997 | Diekhans | 56/10.2 F |
| 5,713,190 A | * 2/1998 | Vermeulen et al. | 56/10.2 E |
| 5,715,665 A | * 2/1998 | Diekhans et al. | 56/10.2 F |
| 5,715,666 A | 2/1998 | Huster et al. | 56/10.2 F |
| 5,828,971 A | * 10/1998 | Diekhans et al. | 701/41 |
| 5,911,669 A | * 6/1999 | Stentz et al. | 56/10.2 F |
| 6,095,254 A | * 8/2000 | Homburg | 172/6 |

FOREIGN PATENT DOCUMENTS

| | | | |
|---|---|---|---|
| DE | OS 21 50 298 | 5/1972 | ............ B62D/5/00 |
| DE | 92 07 482 U1 | 10/1992 | |
| DE | 93 12 542 U1 | 11/1993 | |
| DE | 195 39 275 A1 | 4/1997 | ........... A47B/96/14 |
| DE | 197 03 836.8 | 8/1998 | ............ B62D/1/00 |
| DE | 197 16 201 A1 | 10/1998 | ............ B62D/7/15 |

OTHER PUBLICATIONS

US Application No. 09/076,160 Filed May 12, 1998 "Automatic Steering Mechanism and Method for Harvesting Machine"; Attorney Docket No. 3824/59156–018.
US Application No. 09/412,668 Filed Oct. 5, 1999 "Automatic Steering System Using an Ultrasonic Position–finding Device"; Attorney Docket No. 3898/59156–066.
US Application No. 09/163,843 Filed Sep. 30, 1998 "Device and Method for Detecting Cultivation Boundaries and Other Guide Variables"; Attorney Docket No. 3813/59156–036.
US Application No. 09/103,431 Filed Jun. 24, 1998 "Contour Scanning Apparatus for Agricultural Machinery"; Attorney Docket No. 3837/59156–019.

* cited by examiner

Primary Examiner—Robert E. Pezzuto
Assistant Examiner—Árpád F Kovács
(74) Attorney, Agent, or Firm—Husch & Eppenberger, LLC; Robert E. Muir; Dutro E. Campbell, II

(57) ABSTRACT

An adjusting device for a sensor unit mounted on a field machine, or a harvester or tractor, and an associated method for positioning the field machine and sensor unit for locating a working edge of a field. The sensor unit can be mounted on a cutter bar assembly of a field machine via a supporting arm. The sensor unit may be adjusted horizontally or vertically. The sensor produces a signal that is communicated to a steering control unit to guide the field machine along the working edge of the field. The position or alignment of the sensor unit relative to a working edge of the field may be indicated on a two-dimensional display.

20 Claims, 7 Drawing Sheets

METHOD OF ADJUSTING A SENSOR UNIT MOUNTED ON A FIELD MACHINE AND AN ADJUSTING DEVICE THEREFOR

FIELD OF THE INVENTION

The invention relates to field machines which have steering units that are controlled by signals from sensors; the sensors may detect the working edge of the field, such as the boundary between plowed and unplowed ground or the boundary between harvested and unharvested areas of a field.

BACKGROUND OF THE INVENTION

Applicant is aware of German Patent publication 197 03 846.8 and U.S. Pat. Nos. 3,991,618; 4,263,979 and 5,303,636, the disclosures of which are incorporated by reference herein.

U.S. Pat. No. 3,991,618 discloses a device for detecting the working edge of a field. The disclosed sensor unit has an array of sensors which are placed at various points of the harvesting machine, i.e., the sensors are located at the front and back of the machine, and are mounted in close proximity to the ground. The sensors are touch sensitive; they incorporate a feeler arm which detects the presence or absence of the crop. The signal produced by the sensors is supplied to a steering control unit thereby automatically guiding the machine along the working edge of the field. A disadvantage of the known device is that it requires a plurality of sensors located at different positions, so the device is relatively expensive. The sensors also suffer undesirable wear and tear because of the mechanical stresses to which they are subjected. Due to their close proximity to the ground, there is a risk of them being damaged by unpredictable external effects. The present invention may minimize these risks.

SUMMARY OF THE INVENTION

The present invention relates to a sensor unit mounted on a field machine, in which a signal produced by the sensor unit is conveyed to a steering control unit for guiding the field machine along a working edge of the field. More particularly, the present invention provides a means for automatically aligning the field machine and sensor unit with a reference point or a reference line and to an alignment method. The invention includes an adjusting device for the sensor unit. Further, an optical display or indicator unit is coupled to the sensor unit such that, in a starting position of the field machine, and at other times, the horizontal and/or vertical alignment of the field machine and sensor unit relative to the working edge of the field may be indicated by the indicator element or display.

The adjusting device and the sensor unit may be mounted on a retaining arm extending transversely to the direction of movement of the machine, or extending perpendicularly. Loosening of the sensor unit in the mount allows the sensor unit to be simultaneously rotated about, and moved in a straight line along, the retaining, arm to provide an initial setting for example.

The method and apparatus in accordance with the invention may also provide automatic aligning or realigning of the field machine and the sensor unit with a reference point or a reference line. The particular advantage of the method according to the invention is that the setting for the adjustment of the sensor unit can be detected and fixed by using electronic means that are provided for other purposes. Positioning means may be associated with the field machine, and the sensor unit for displacing the sensor unit horizontally and/or vertically. These positioning means maybe controlled, at least in part, by a central processing unit. The signal produced by the sensor unit is evaluated in this central processing unit, and the field machine and the sensor unit is then moved in dependence thereon until a correct position is reached, as denoted by the detection of a reference point or a reference line.

Consequently, one object of the present invention is to provide a method of adjusting a sensor unit mounted on a field machine which allows the state of adjustment of the sensor unit to be detected and set in a simple manner.

Further advantages and objects of the invention will be apparent by reference to the drawings, the Description of the Drawings and the Detailed Description of the Invention.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

The embodiments of the invention will be explained in detail hereinafter with the help of the drawings.

Figure 1:
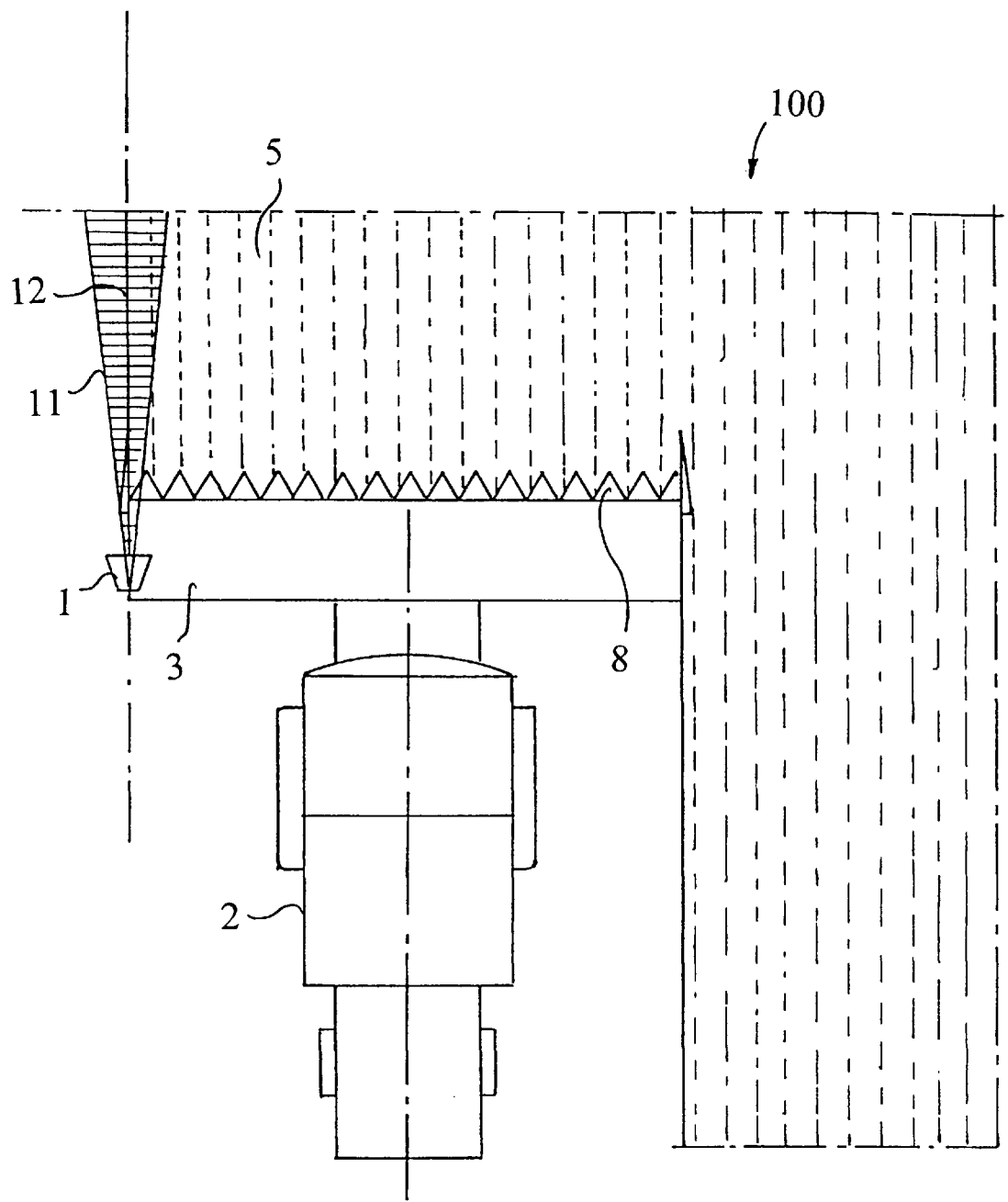
FIG. 1 is a top view of the harvesting machine with the sensor unit incorporated on the harvesting machine.
Figure 5:
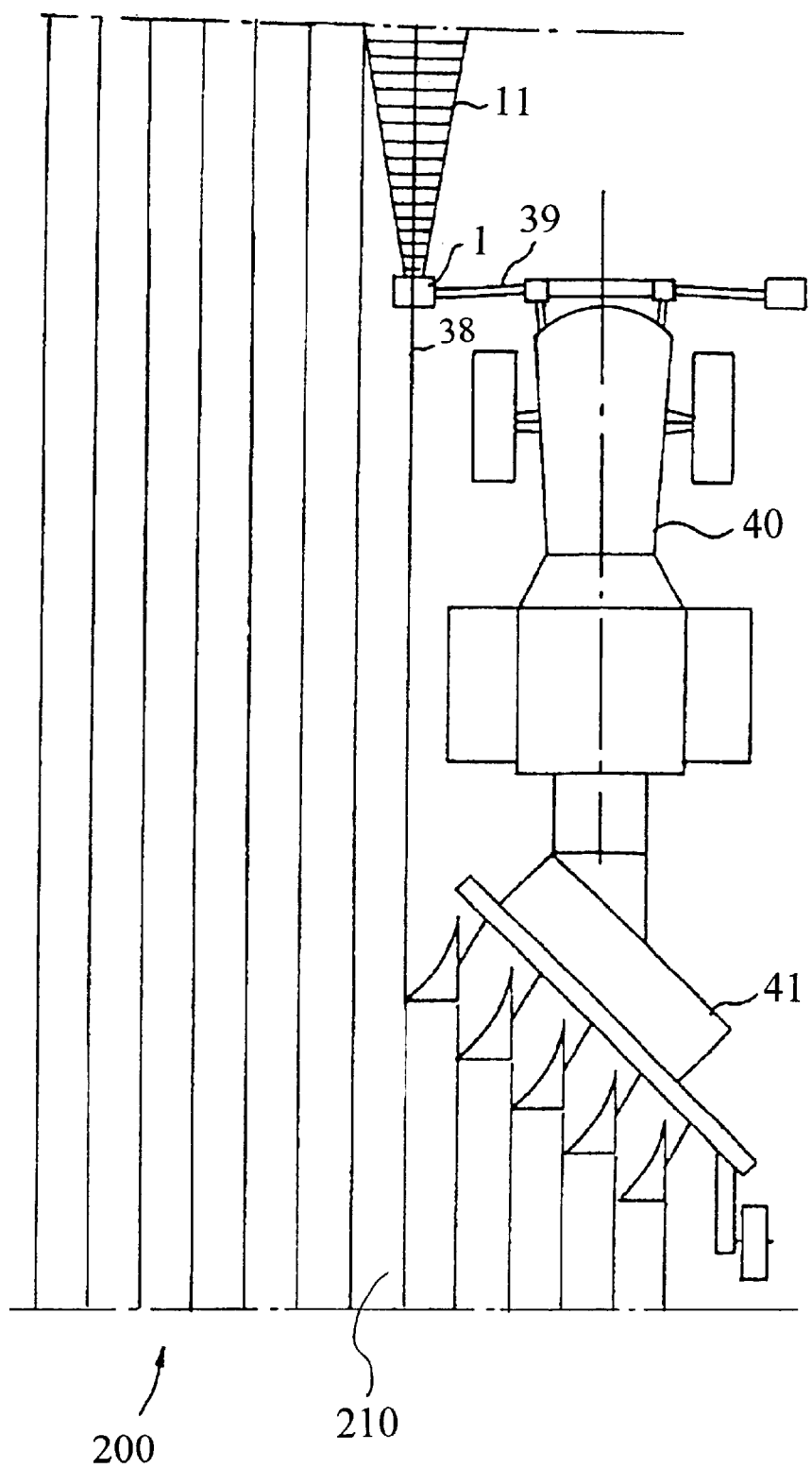
FIG. 5 is the sensor unit attached to a field tractor.

In accordance with the invention a sensor unit 1 may be employed for detecting the working edges 12 in a field 100. It may be employed for detecting a working edge 12 of the field 100 when using harvesting machines as shown in FIG. 1. Alternatively, it may also be employed for detecting a working edge 38 of the field 200 when using towing machines such as tractors 40, towing plows 41 as shown in FIG. 5.

Figure 2:
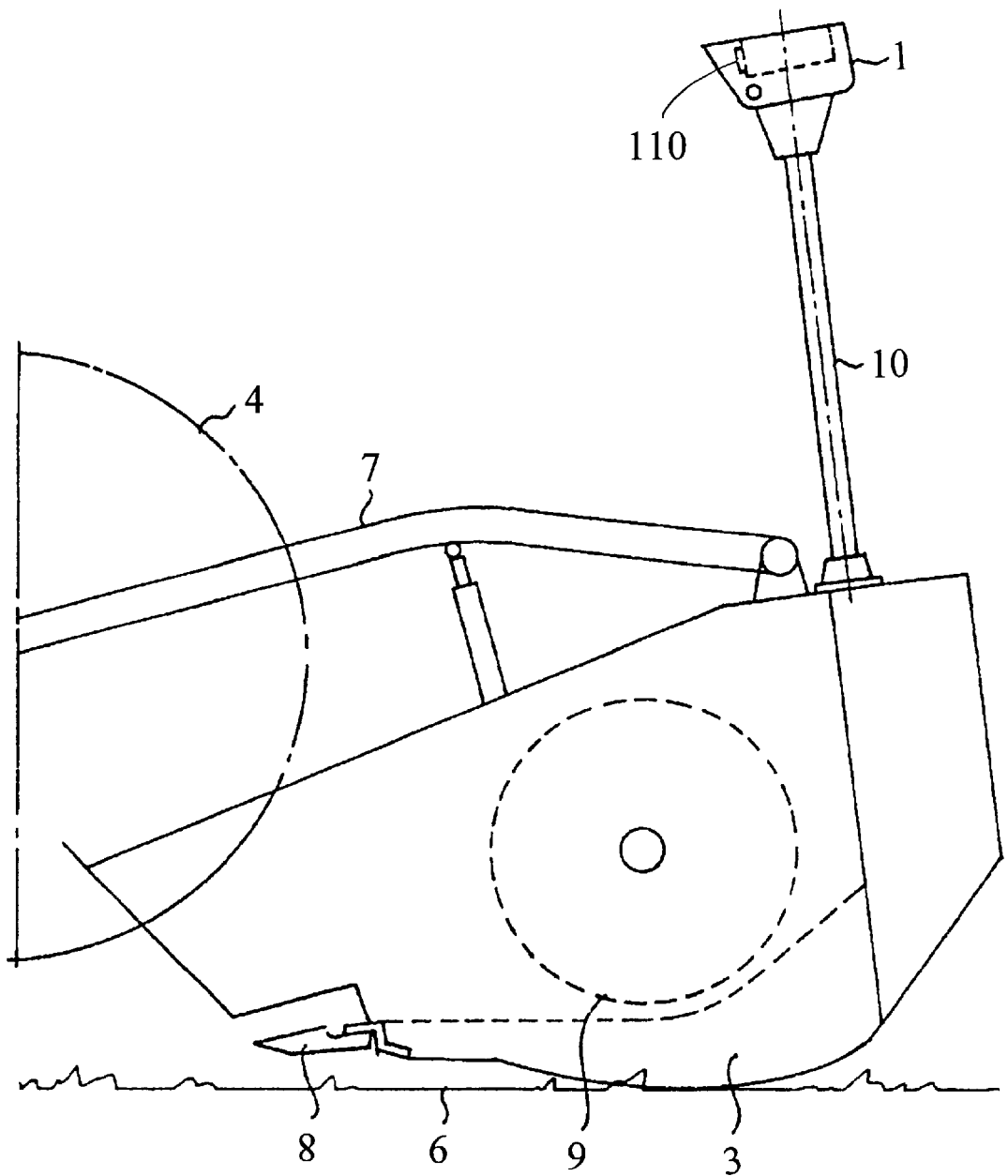
FIG. 2 is a side view of one embodiment of the invention with the sensor unit mounted on the cutter bar assembly of the harvesting machine.
Figure 3:
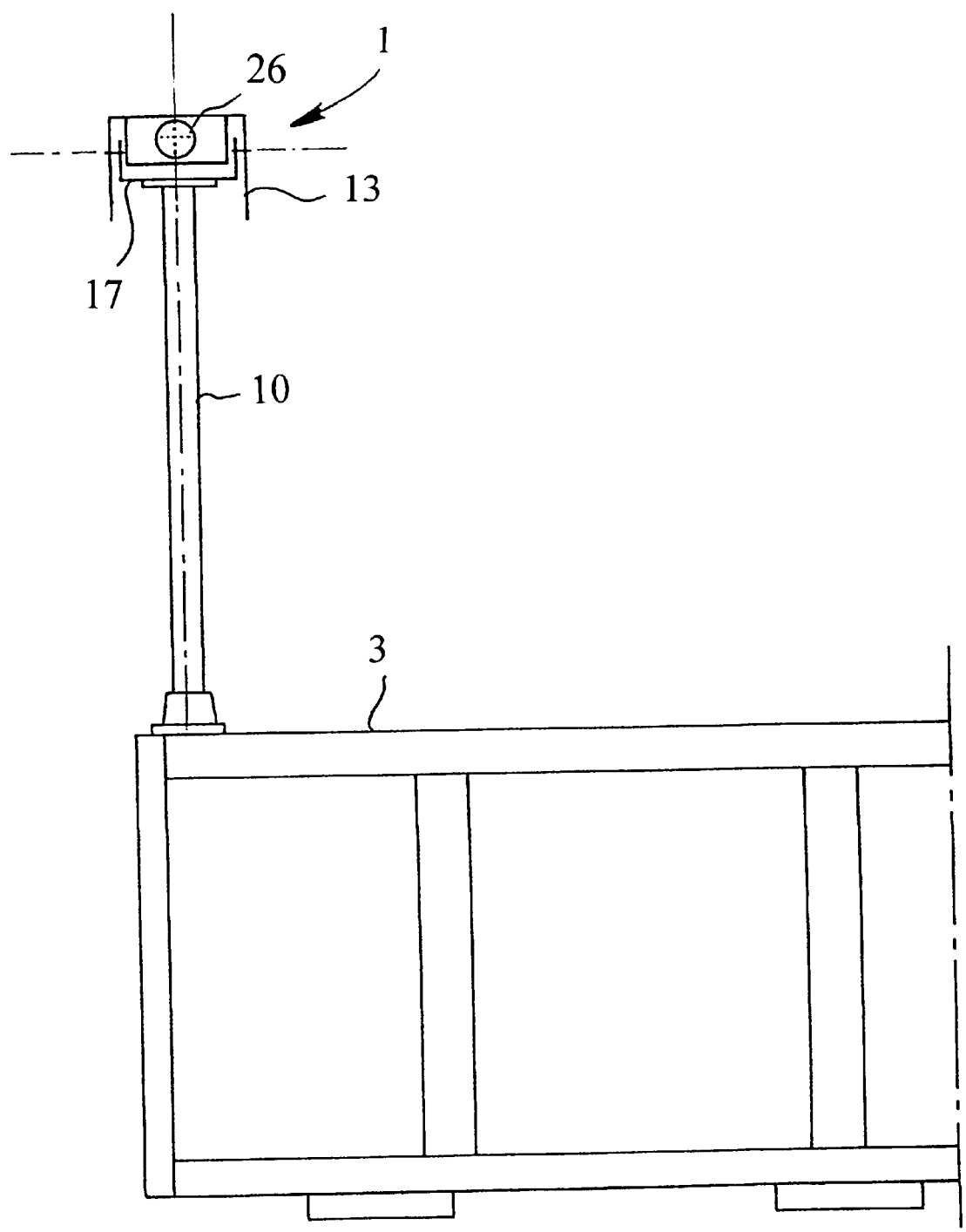
FIG. 3 is the sensor unit in a rear view according to FIG. 2.

As shown in FIG. 1, the sensor unit 1 is mounted on a combine harvester 2 which is an example of a self-propelled harvesting machine. The sensor unit 1 is mounted on a cutter bar assembly 3, at the front left in the direction of motion of the combine harvester 2. The combine harvester 2 has a reel 4 which advances the crop 5 towards an intake roller 9 as shown in FIG. 2. The reel 4 is pivotally connected to the machine via a reel supporting arm 7. A knife edge 8 is disposed between the reel 4 and the intake roller 9 near the bottom of the cutter bar assembly 3.

An upwardly projecting supporting arm 10 having a sensor unit 1 mounted at its free end is located towards the rear end of the cutter bar assembly 3. The supporting arm 10 is inclined forwardly at an acute angle to the vertical axis to facilitate the adjustment of the sensor unit 1 in line with the working edge 12 of the field. The supporting arm 10 is of such length that the sensor unit 1 is able to detect the working edge 12 of the field over the top of the reel 4.

Figure 4:
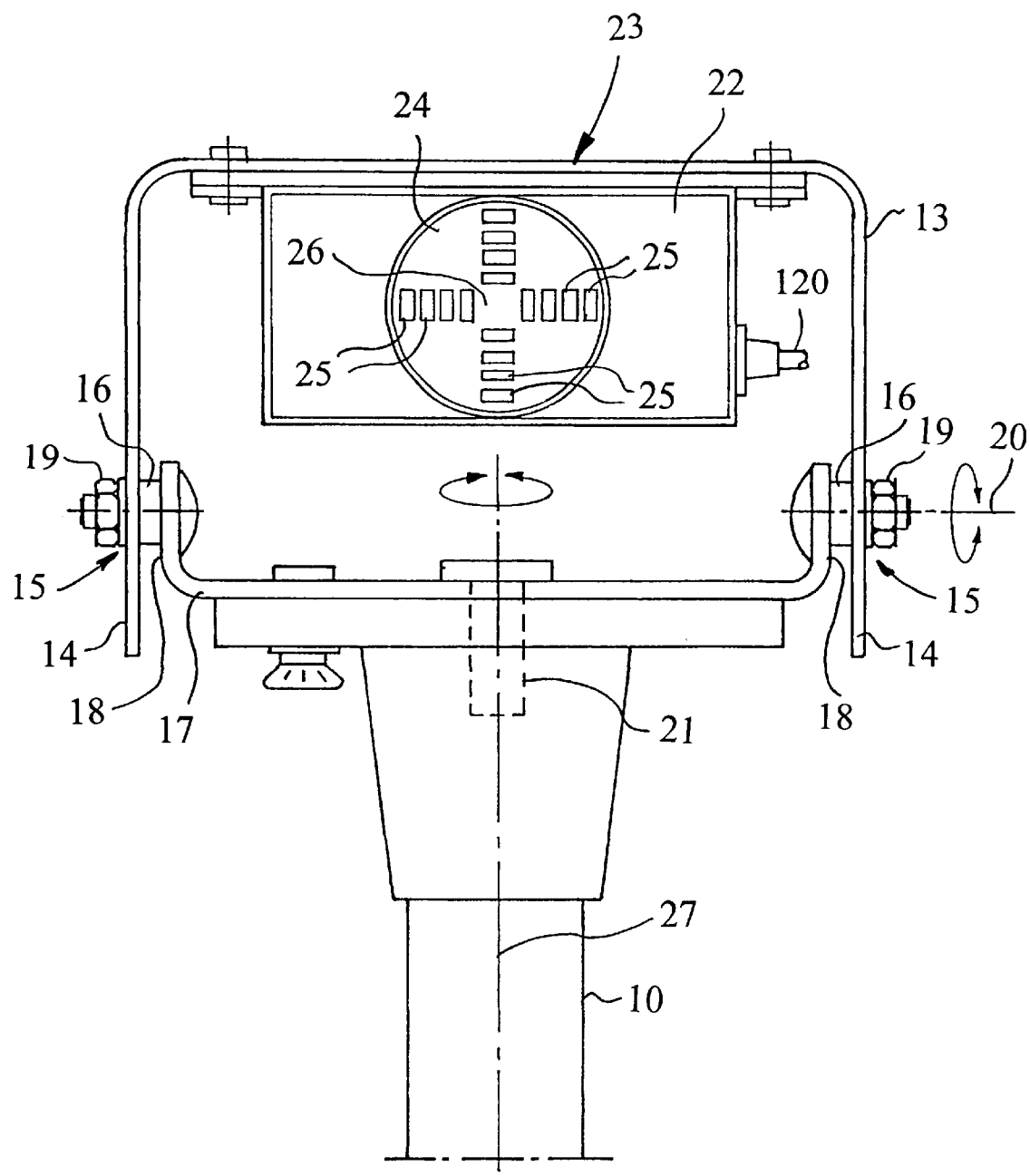
FIG. 4 is the sensor unit in an enlargement view according to FIG. 3.

The sensor unit 1 is mounted on a frame-like, downwardly extending, open-ended first U-shaped lug member 13, as shown in FIG. 4. The first lug 13 has free ends 14 which incorporate mutually co-axial bores 15 for accommodating pivoting fastener means 16 which allow U-shaped lug member 13 to be connected to a second U-shaped lug member 17 mounted on the supporting arm 10, as shown. The second lug member 17 on the supporting arm 10 has upright tabs 18 incorporating cooperating bores 15 which are aligned with the bores 15 in the first lug 13. The ends 14 of the first lug 13 and the second lug 17 are coupled together, in an adjustable manner, by said pivoting fastener means 16. The pivot fastener means can be, but is not limited to, a bolt-like part or similar fastener. Adjustment of the sensor unit 1 in a vertical plane can be made by rotating the sensor unit 1 about a pivotal axis 20 extending through the bores 15, first loosening the nuts 19 on the ends of pivoting fastener means 16. The adjustment can be fixed by retightening nuts 19.

The second lug 17 is mounted on the supporting arm 10 by means of a bolt-like connection 21, as shown, so that the sensor unit 1 can be adjusted in the horizontal plane. The bolt-like connection 21 extends axially of the supporting arm 10 and allows the second lug 17 to be rotated circumferentially of the supporting arm 10 once it has been loosened. The first lug 13 carrying the sensor unit 1 moves simultaneously with lug 17.

The adjustment of the sensor unit 1 can be effected independently in the horizontal and vertical directions by appropriately manipulating the pivoting fastener means 16 and the bolt-like connection 21 respectively. This simplifies the initial adjustment process because these two adjustment steps can be performed one after the other.

The sensor unit 1 is aligned in the direction that the combine harvester 2 will travel. The sensor unit 1 scans the capture zone 11, as shown in FIG. 1.

The sensor unit 1 may be optically aimed, for example by a laser sight, as known in the art. The aiming point for sensor 1 may be at a point at a predetermined distance in front of the machine 2. This previously defined distance, may be between about twelve meters and sixteen meters, but is preferably about fourteen meters, for example. The exact setting is dependent on the steering characteristics and the speed of travel of the combine harvester 2, as is known in the art. If the sensor unit 1 is set up for too great a distance, a change in the working edge 12 of the field 100 will be detected too soon so that the steering of the combine harvester 2 will respond too early thereby resulting in an over-correction. If the distance is set too small, any deviation in the working edge 12 of the field will be detected too late so that the steering of the combine harvester 2 will not be able to react thereto in time.

Adjustment of the sensor unit 1 in a horizontal plane is required in addition to the adjustment thereof in the vertical plane. This is because the working edge 12 of the field 100 needs to be in the central area of the capture zone 11 being scanned by the sensor unit 1. An adjusting mounting device is provided for this purpose so that the sensor unit 1 can be adjusted at the beginning of each work day, for example, or at the beginning of the harvesting season.

This initial adjustment or calibration may be made by placing the combine harvester 2 in parallel alignment with the intended working edge 12 of the field 100 in the direction of motion. The sensor unit 1 can be set up on the working edge 12 in this start position. An available working edge 12 or side edge of the field or a special identification point on the combine harvester 2 itself may also be used as the reference point for the initial adjustment of the sensor unit 1. If the reference point is located on the combine harvester 2, for example as described herein, an appropriate realignment means, for moving the sensor unit from its initial calibration position into its active operational position may be provided.

The adjusting device described hereinafter positions combine harvester 2 with the working edge 12 of a field, in cooperation with sensor unit 1. The adjusting device makes it possible to improve the work load of the cutter bar assembly 3 because the lateral edge of the cutter bar assembly 3 of the combine harvester 2 is automatically steered along the detected working edge 12 of the field once the sensor unit 1 has been initially calibrated. The cutting process then makes full use of the width of the cutter bar assembly 3.

As shown in FIG. 4, the sensor unit 1 may be aimed by a conventional sight having a laser source 110, as is known in the art. The sensor unit 1 has a conventional indicator unit 23 on its rear face for indicating the predetermined calibration position of the sensor unit. The indicator unit 23 has a "gunsight" type reticle display or indicator field 24 with four rows of indicator elements 25 which are arranged at right angles. As shown, each row has 25 which may be light emitting diodes (LED). The indicator elements 25 extend towards a common central point 26 which forms a target point for the adjustment of the sensor unit 1. The adjustment is correct when the innermost indicator elements 25 adjacent the central point 26 light up as described herein. The indicator field 24 is similar to that of a telescopic gunsight, as will be understood. The sensor unit 1 may detect the deviation from the working edge 12 of field 100 by means of echo signals and ultrasonic sensors such as 42, 43 described herein. Other means, such as sensors detecting differences in reflected light may also be used, as known in the art. These sensors, and similar non-contact sensors, are especially useful since they are able to receive and transmit information concerning the location of the working edge 12 of field 100 without physical contact. The signals are received and generated remotely, i.e., by electronic and/or ultrasonic mechanisms. The sensors can be placed on the field machine 2 at a protected location away from physical contact with crop 5 and away from hazards, as shown.

When the sensor unit 1 is pivoted about the horizontal pivotal axis 20, the area seen by indicator elements 25 moves along the row of indicator elements 25 that is co-axial with the rotational axis 27. If the sensor unit 1 is pivoted about the rotational axis 27 of the supporting arm, illuminated field moves along the horizontal row of indicator elements 25. The vertically extending indicator elements 25 are coaxial with or parallel to the rotational axis 27. The horizontally extending indicator elements 25 are in parallel with the pivotal axis 20. During the initial adjustment process, preferably with the combine harvester 2 stationary, the sensor unit 1 and the combine harvester 2 are aligned with the working edge 12 of the field 100, i.e. with the edge of the crop 5, as previously described.

Once the sensor unit 1 has been rotated about the pivotal axis 20 and then about the rotational axis 27 or vice versa until the endmost indicator elements 25 facing the central point 26 have lit up, the pivoting means 16 and the bolt-like connection 21 are tightened so as to fix the sensor unit in its initial adjusted position. Harvesting can then commence. This adjustment preferably occurs at the beginning of the harvesting season but can easily be performed by the operator at any time.

Figure 8:
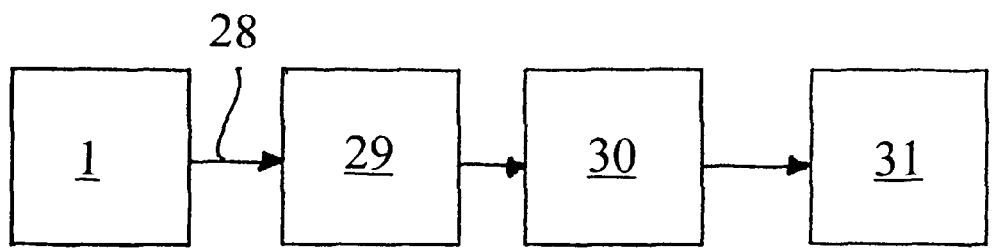
FIG. 8 is a block diagram of the members connected to the sensor unit.
Figure 9:
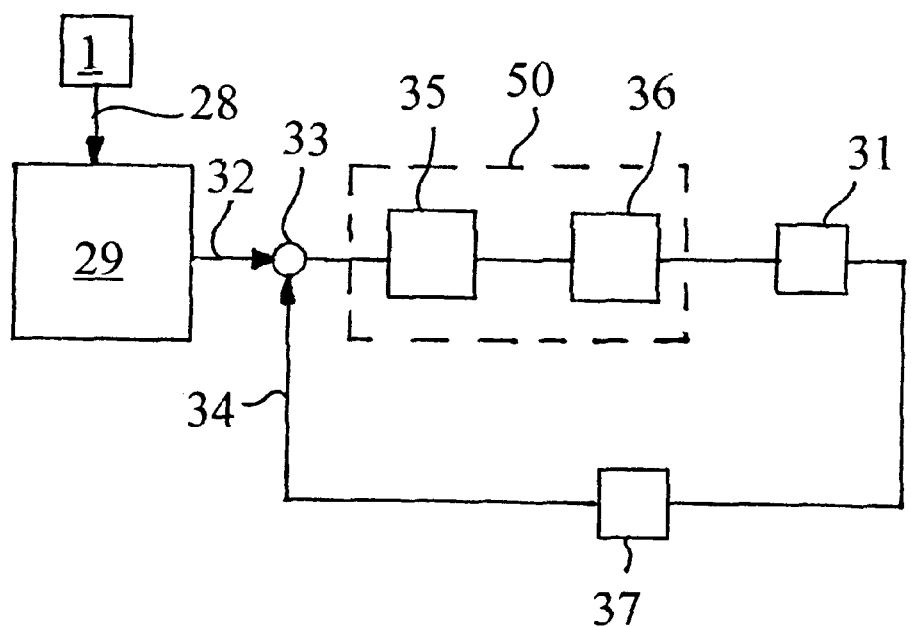
FIG. 9 is a block diagram of the members connected to the sensor unit for regulating the steering.

When harvesting commences, a sensor signal 28 from the sensor unit 1 is conveyed through connection 120 to a processing unit 29, as indicated in the block diagrams of FIG. 8 and 9. The signal 28 is conveyed as the combine harvester 2 is moving along. Preferably, the unit 29 is in the form of an electronic control unit incorporating a steering program which cooperates with a steering control unit 30, as in known in the art. The steering control unit 30 incorporates control valves for actuating a steering cylinder 31. Thus, the sensor signal 28 can provide an input to be used in controlling the steering cylinder 31, as indicated in the block diagram of FIG. 8.

Alternatively, the signal 28 may also be employed for the regulation of the steering cylinder 31 as indicated in the block diagram of FIG. 9. For this purpose, the signal 28 is processed in the processing unit 29 in accord with a predefined steering program. A preferred value 32 is present at the output of the processing unit 29 and this value is passed to a comparator 33. The actual value 34 of the machine steering angle is compared with the preferred value 32 in the comparator, using conventional means. The tracking difference is passed to the input of a regulator 35. The preferred regulator is in the form of a digital regulator. The output signal from the regulator 35 is effective on one or more steering valves 36 for controlling the steering cylinder 31. The actual steering angle of the steering cylinder 31 is detected and conveyed to the comparator 33 as an actual value 34 via a converter 37 which may be a measuring transducer or an analog/digital converter. The regulator 35 and the valves 36 form part of a steering regulating unit 50 which permits the steering cylinder to be regulated automatically to the preferred steering angle provided by the processing unit 29. Automatic steering is thereby possible during harvesting. The detection of the working edge 12 of the crop 5, by means of the sensor unit 1 allows the harvesting process to be reliably accomplished while saving time and utilizing the cutting width of the cutter bar assembly 3 to the full extent. The edge 12 of the crop 5 can be precisely identified by coordinating the sensor unit 1 with the left hand edge of the cutter bar assembly 3 and the crop 5 can be cut up to virtually the very edge thereof.

In an alternative embodiment, the sensor unit 1 may also be used for detecting an edge 38 infield 200 formed by a furrow 210 as shown in FIG. 5. The edge 38 forms the working edge and can be detected by virtue of the differing heights on the two sides of the edge 38. The sensor unit 1 is mounted on a retaining arm 39 of a towing machine or tractor 40. The retaining arm 39 extends in front of the tractor 40 at right angles to the direction of travel and the edge 38 of the field 200. The sensor unit 1 is located vertically above the edge 38 and is aligned therewith. The tractor 40 pulls a plow 41 along behind it. In this embodiment, the indicator unit 23 preferably is located in the operator's cab and serves to check the automatic adjustment process which may be started by the operator actuating a switch, for example. The automatic adjustment is effected by processing and evaluating the signal 28 produced by the sensor unit 1. This may be conveyed via an electric cable, such as 120 previously described, or by radio signal to the central processing unit 29 in the tractor 40, as is known in the art. The actual sensor signal 28 symbolizing a specific point being scanned on the ground 6 is processed in the processing unit 29. The initial calibration is performed by positioning tractor 40 in parallel with the edge 38 of the field 200, similar to the previously described operation for combine harvester 2. Following the adjustment of the sensor unit 1 relative to the edge 38, whereby the sensor unit 1 is aligned in parallel with the edge 38 or has taken up a predetermined neutral position, the sensor unit 1 is fixed in this position. This state of adjustment can be checked from the accord between an illuminated indicator element 25 symbolizing the actual position of the sensor unit 1 and a predefined identification means. This identification means is preferably located at the center point 26 of the indicator unit 23. A signal, which may serve as a control variable for automatically steering the tractor 40 in a straight line, is then produced in dependence on the state of adjustment that has now been established in the sensor unit 1.

The indicator unit 23 is provided for checking the state of alignment that should be adopted by the indicator field 24, i.e. the arrangement of indicator elements 25 in the indicator unit 23 reflects the position of the field machine 2 relative to the working edge 12 of the field 100 in such a way that the correct state of adjustment can be identified when an indicator element 25 controlled by the signal 28 from the sensor is in accord with a predefined identification means. The controlled indicator elements 25 represent the actual position of the working edge 12 in relation to machine 2, as detected by the sensor unit 1. An identification means represents the correct alignment state of the sensor unit 1 and machine 2, as defined by the reference point or the reference line. The identification means is preferably located in a central point 26 of the indicator unit 23 so that the correct state of adjustment can be easily recognized and checked.

The particular advantage of the adjusting device according to the invention is that the adjustment of the sensor unit 1 on the field machine can be easily managed by means of the optical indicator unit 23. The indicator unit 23 has a plurality of indicator elements 25 arranged in rows, and at least two of the rows of indicator elements 25 are spaced apart from one another. The preferred position of the sensor unit 1 is then indicated when the indicator elements 25 facing one another at the end of the rows illuminate. The preferred position of the sensor unit 1 is thus indicated when the illuminated indicator elements 25 are relatively spaced by the least possible amount. The rows of indicator elements 25 may correspond to the number of directions in which the sensor unit 1 can be displaced. By combining an adjustment in a horizontal plane on the one hand, and an adjustment in a vertical plane on the other, one obtains two components of motion which are each symbolized by a row of indicator elements 25. One row of indicator elements 25 may extend in the direction of motion, for example, axially relative to the supporting arm 10, as shown in FIG. 2. The read-out from the indicator unit 23 is thereby facilitated due to this association with the direction of movement.

The position of the sensor unit 1 may be initially adjustable by means of a first U-shaped lug 13 attached to a supporting arm 10 of the field machine, as previously described. Precise and reliable adjustment of the sensor unit 1 about a pivotal axis 20 is made possible by virtue of an arrangement of bores 15 or pivoting means 16 located at opposite ends of the first. U-shaped lug 13, which bores 15 define said axis. Insofar as the sensor unit 1 comprises a first U-shaped lug 13, this first lug 13 may, in conjunction with the retaining arm 46, shown in FIG. 7, form an enclosure in which the sensor unit 1 is mounted and protected from environmental hazards.

Figure 6:
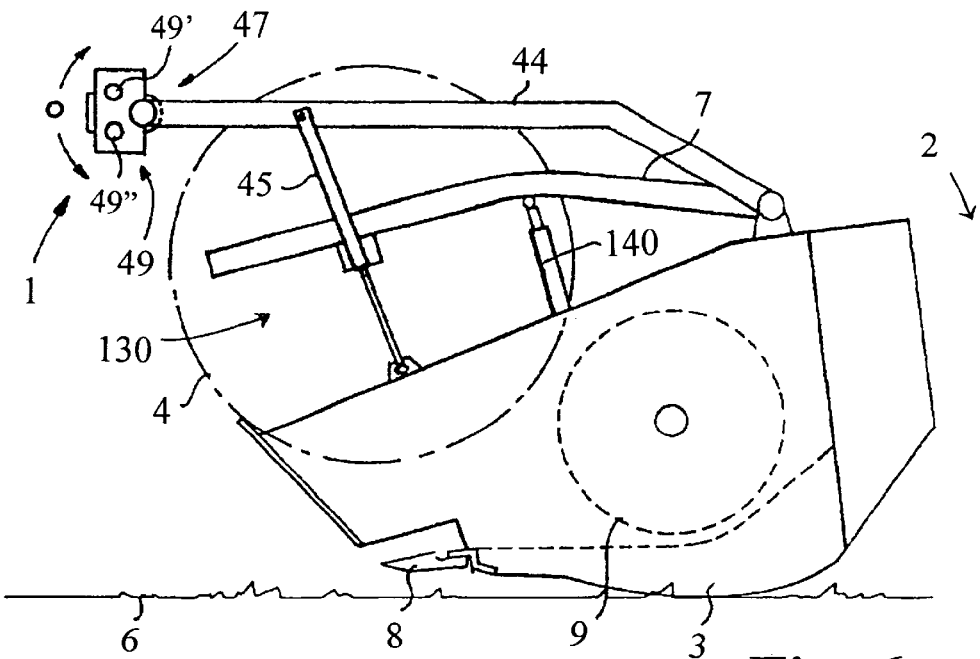
FIG. 6 is a side view of an another embodiment with the sensor unit mounted on the cutter bar assembly of a harvesting machine.
Figure 7:
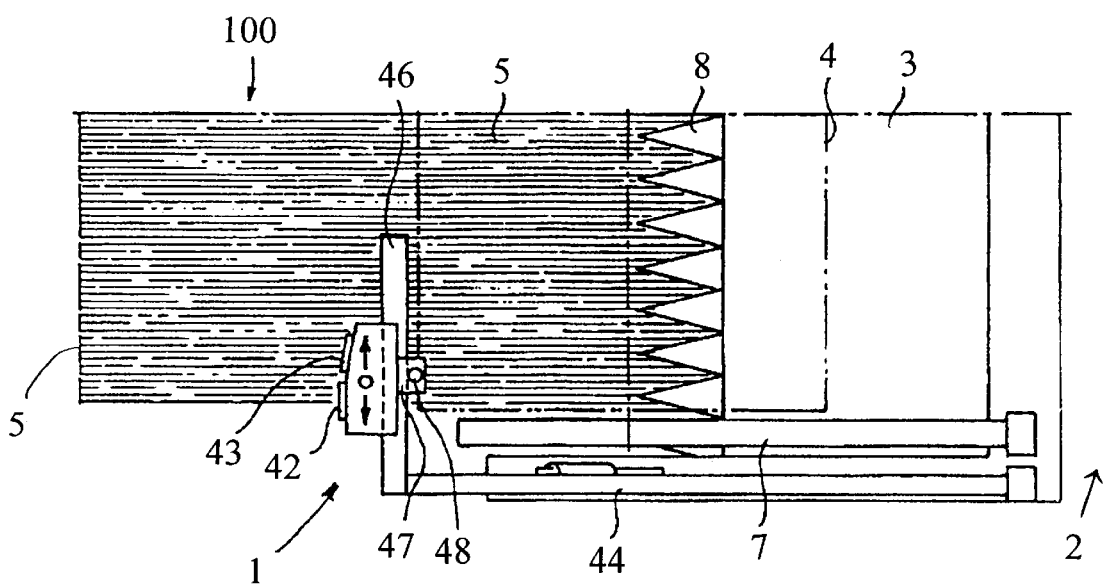
FIG. 7 is a top view of the sensor unit according to FIG. 6.

As shown in FIG. 6 and FIG. 7, the combine harvester 2 may be equipped with a sensor unit 1 which has two ultrasonic sensors 42 and 43. The sensor unit 1 is moveably mounted, on a sensor supporting arm 44 projecting forwardly from the cutter bar assembly 3. The supporting arm 44 is coupled to the cutter bar assembly 3 via a linkwork and can be pivoted from the operational position illustrated in FIG. 6 into a lower transport position by means of a height adjusting means 45 for the supporting arm. The components corresponding to those of the embodiment t shown in FIG. 2 are provided with the same references. However, in FIGS. 6 and 7 the sensor unit 1 is mounted on a retaining arm 46 which is linked to the supporting arm 44 and is located at right angles to the direction of motion of the machine 2. The sensor unit 43 is secured around the retaining arm 46 by means of a fixing element 47 in the form of a housing, and is connectable, in adjustable manner, to the retaining arm 46 by means of a connecting bolt 48. This form of mounting has the advantage that the sensor unit 1 can be moved very rapidly into its position of adjustment. The sensor unit 1 can thereby be moved simultaneously in both the horizontal and the vertical directions. The retaining arm 46 provides the pivotal axis for the adjustment in the vertical direction. The horizontal adjustment is effected by displacing the sensor unit 1 along the retaining arm 46.

The sensor unit 1 shown in FIGS. 6 and 7 may have a first ultrasonic sensor 42 which is directed along the edge 12 of the crop 5 in the direction of travel, and a second ultrasonic sensor 43 which is disposed at an acute angle relative to the first ultrasonic sensor 42 and is directed at the crop 5 itself. The ultrasonic sensors 42, 43 are inclined to the ground 6 such that their respective transmitting signals intersect the ground at positions more than four meters apart, for example. The working edge 12 of the field 100 can be detected from the ratio of their respective echo signals which is a result of the differing alignments of the ultrasonic sensors 42, 43. The sensor signal 28 formed in this manner can be used for controlling or regulating the steering angle of a steering system for a combine harvester 2 in a conventional manner, as previously described.

The adjustment of the ultrasonic sensors 42, 43 is indicated by the individual indicator elements 49 which are in the form of light emitting diodes. An upper indicator element 49' and a lower indicator element 49" are provided on a side wall of the sensor unit 1 for the purposes of adjustment in the vertical plane. If the sensor unit 1 is set at too great a distance from the ground 6, then the upper indicator element 49' is illuminated in red, for example. Conversely, if the sensor unit 43 is set at too small a distance from the ground, the lower indicator element 49" lights up red. Both the upper and lower indicator elements 49', 49" turn green when the sensor unit 1 is set at the correct distance from the ground 6. A hysteresis circuit may be integrated into the sensor unit 1 so as to prevent unwanted blinking of the indicator elements 49', 49", as is known in the art.

In order to adjust the sensor unit 1 horizontally, another indicator element, not shown, may be provided to permit a signal, i.e., a green light, when the first ultrasonic sensor 42 is aligned with the edge 12 of the crop 5. A horizontal adjustment is only required in exceptional circumstances. This adjustment may be performed at the factory since it may be matched to the dimensions of the cutter bar assembly 3. This is due to the fact that the left-hand cutting edge of the cutter bar assembly 3 forms the guide for the crop edge 12 that is being treated thereby. Usually therefore, it is sufficient for the sensor unit 1 to be horizontally aligned on the cutter bar assembly 3. Due to the fact that the second ultrasonic sensor 43 is directed in full on the crop 5, a reliable signal can easily be produced by the sensor for the purposes of detecting the edge 12 of the crop 5. The further processing of the signal may proceed in the same manner previously described herein.

The processing unit 29 also may be used for remotely operating the height adjusting means 45 for the supporting arm 44, shown in FIG. 6. The sensor unit 1 can thereby be displaced vertically in accordance with a predefined adjustment program. The height may thereby be adjusted in dependence on the height of the crop or the grain 5. The sensor unit 1 preferably is set for a specific predetermined distance from the machine 2. The height adjusting means 45 for the supporting arm 44 is preferably an electrically controlled hydraulically operable cylinder 140, shown in FIG. 6.

Further, the indicator unit 23 described herein may include or be in parallel with a cathode ray tube, situated in the control cabin of the field machines 2 and/or 40, to be viewed by an operator. The cathode ray tube may be connected to a microprocessor in the processing unit 29. The cathode ray tube may be employed for other purposes, such as displaying predetermined steering patterns and similar information.

While specific embodiments have been shown and described, this has been by way of illustration and not limitation. The invention should not be limited except as required by the scope of the appended claims and their equivalents.

We claim:

1. A method for guiding a field machine in relation to a working edge of a field, comprising the steps of:

producing a signal from a sensor unit mounted on the field machine, wherein the sensor unit is automatically adjusted to a reference setting, said signal providing information about the location of the working edge of the field;

conveying said signal to a steering control unit in said field machine;

processing the signal in said control unit to produce a control command; and controlling the field machine along the working edge of the field in response to the command produced by the steering control unit.

2. A method as set forth in claim 1, further comprising electronically aligning the sensor unit in response to the sensor signal.

3. A method as set forth in claim 1, further comprising initially adjusting the sensor unit to a reference setting.

4. A method as set forth in claim 1, further comprising displaying the information from the sensor signal visually.

5. A method as set forth in claim 4, further comprising indicating the position of the sensor unit in relation to a predefined correct state.

6. The method of claim 5 comprising correcting the signal from the sensor unit in response to the displayed information.

7. An adjusting device for a sensor having a first member for receiving the sensor, the sensor being mountable thereon, the first member being pivotably connected to a second member, the second member and the first member being relatively pivotable around a common axis to provide adjustment in a first plane, the second member being movably connected to a third member to provide adjustment in a second plane, the second plane being perpendicular to the first plane, the third member being a supporting member, the first and second members having a selective fastener to selectively release and fix the relative pivoting movement of the first and second members to define a first reference setting when fixed, the second and third members having a selective connector to selectively release and fix a location of the second member relative to the third member to define a second reference setting when fixed, the first and second reference settings defining an alignment for a sensor mounted in the device.

8. An adjusting device as set forth in claim 7, further comprising:

means for mounting the supporting member to a field machine.

9. An adjusting device as set forth in claim 7, wherein the first member is a first U-shaped lug having free ends which incorporate mutually aligned bores, and the second member is a second U-shaped lug having free ends which incorporate mutually aligned bores, the bores of the first and second U-shaped lugs defining the common axis of the first and second members.

10. An adjusting device as set forth in claim 9, wherein the first and second U-shaped lugs form a space for accommodating a sensor unit.

11. An adjusting device as set forth in claim 9, wherein the second U-shaped lug is rotationally connected to the third member and the third member is a longitudinal supporting arm.

12. An adjusting device as set forth in claim 9, wherein the third member is a transverse supporting arm.

13. An adjusting device as set forth in claim 8, wherein the supporting member is mounted on a field machine such that the supporting member extends above the field machine assembly and extends in the direction of travel of the field machine.

14. An adjusting device as in claim 12, further comprising:

a retaining arm connected to the supporting arm.

15. The device of claim 7 wherein the device has a sensor mounted in the device, the sensor producing a signal for a controller.

16. The device of claim 15 wherein the controller has means for comparing the signal from the sensor with stored information and has means for producing a command signal for guiding a field machine.

17. The device of claim 16 wherein the field machine is guided by the command signal.

18. An adjusting device as set forth in claim 14, further comprising a remote control for controlling the position of the sensor unit.

19. The device of claim 15, wherein the device has means for visually displaying the signal information from the sensor.

20. The device of claim 19, wherein the controller has electronic means for adjusting the sensor.

* * * * *